United States Patent [19]

Egly et al.

[11] 3,990,575

[45] Nov. 9, 1976

[54] CASSETTE CONTAINER LOCK MECHANISM

[75] Inventors: Robert A. Egly, Corona del Mar; Peter G. Carlier, San Clemente, both of Calif.

[73] Assignee: Memorex Corporation, Santa Clara, Calif.

[22] Filed: Dec. 10, 1975

[21] Appl. No.: 639,575

[52] U.S. Cl. .................. 206/387; 292/DIG. 38; 292/205
[51] Int. Cl.² ............. B65D 85/672; B65D 27/30; B65D 33/34; B65D 55/06
[58] Field of Search ............ 292/DIG. 38, 205, 318, 292/321, 322; 24/16 PB; 206/387, 1.5; 190/41 R

[56] References Cited
UNITED STATES PATENTS

| | | | |
|---|---|---|---|
| 855,086 | 5/1907 | Bentley | 292/205 |
| 1,688,739 | 10/1928 | Moore | 292/321 |
| 3,737,067 | 6/1973 | Palson | 206/387 |
| D224,177 | 7/1972 | Wallace | 206/387 |
| D224,960 | 10/1972 | Wilson | 24/16 PB |
| D236,291 | 8/1975 | Schurman | 206/387 |

*Primary Examiner*—William Price
*Assistant Examiner*—Douglas B. Farrow
*Attorney, Agent, or Firm*—Limbach, Limbach,& Sutton

[57] ABSTRACT

A cassette container having a latch member connected to the top of the container by an integral, flexible hinge which latches against a pair of pins on the bottom of the container, the pins incorporating slots which receive a plastic locking seal therethrough to prevent an opening of the latch without destruction of the seal.

5 Claims, 4 Drawing Figures

CASSETTE CONTAINER LOCK MECHANISM

BACKGROUND OF THE INVENTION

The present invention relates to a latch member for a cassette container and more particularly to a self-locking shackle seal for a cassette container.

Certain types of cassette containers, for example, containers for video tape recorder tape cassettes, are made to have a top and bottom which are hinged on one side and which close together to form a complete container for a cassette cartridge. It is desirable when shipping such containers, such as through the mail, to be able to provide a means for both ensuring that the lids stay latched together and for providing a seal to show whether the lids have been opened. Such a self-sealing shackle must be relatively inexpensive to replace, must be integral with the cassette container, and must be easily opened by authorized personnel. It must also be relatively inexpensive to manufacture the latch mechanism.

SUMMARY OF THE INVENTION

The above requirements are met by a latch according to the invention for use with a cassette container of the type having top and bottom lids. The latch comprises a latch member having a flexible hinge integral with both the latch member and one of the top and bottom lids of the container and a pair of spaced apart pins on the other of the top and bottom lids. The latch member has a free end which fits between the pins and engages with them to hold the lids closed. The pins have slots therein for receiving a flexible seal which passes over the latch member and through the pin slots, thus preventing the latch member from being disengaged from the pins without the destruction of the flexible seal. The seal in the preferred embodiment of the invention encircles at least a portion of each pin.

In the preferred embodiment the free end of the latch member has a pair of parallel cross legs so that it has in effect an H-shape. When the free end of the latch member is engaged with the pins, the pins project between the cross legs. The slots in the pins open toward the rearmost cross leg of the free end of the latch member so that the rearmost cross leg closes the rearward facing openings of the pin slots when the free end is engaged with the pins. The pins also have projecting lugs parallel to the slot and above it to help restrain the seal in the slot. This construction prevents the seal from being withdrawn from the pin slots without breaking the seal.

It is therefore an object of the present invention to provide a self-shackling seal for a cassette container;

It is another object of the invention to provide a latching member for a cassette container which provides for a flexible seal to hold the latch member closed and which prevents the latch member from being opened without the destruction of the seal;

It is still another object of the invention to provide an inexpensive, self-latching seal for a cassette container.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
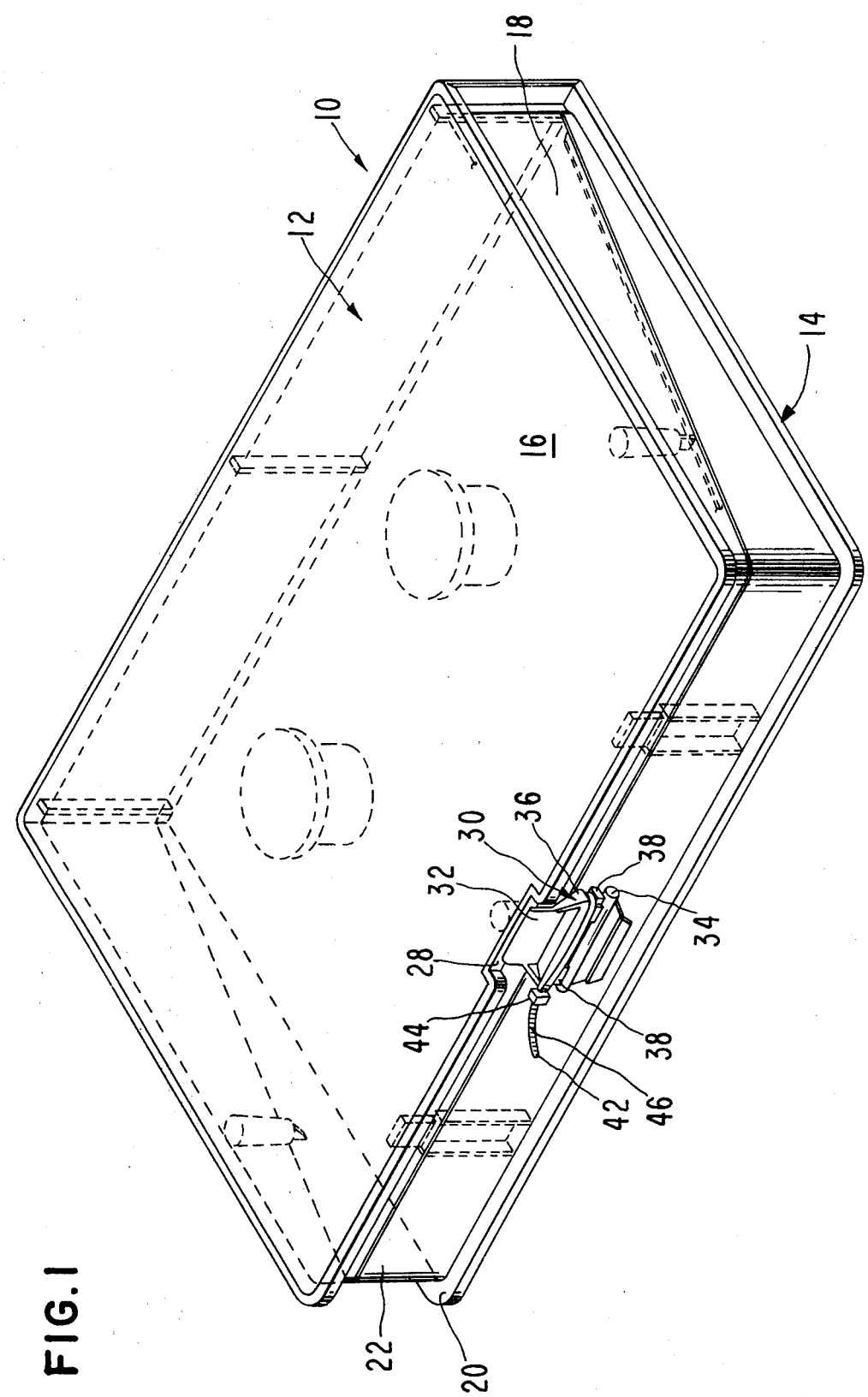
FIG. 1 is a perspective view of a cassette container incorporating the sealing latch of the invention.

Referring to the Figures, the cassette container 10 includes a top lid 12 and a bottom lid 14. The top lid 12 has a planar portion 16 and sidewalls 18 which are integral with the planar portion 16. Similarly, the bottom lid 14 has a planar portion 20 and integral sidewalls 22.

At approximately the midpoint of the unhinged side of the top lid 12 the planar portion 16 is provided with an indentation 28 out of which projects a latch member 30 which has a flexible hinge 32 integral with both the latch member 30 and the planar portion 16 of the top lid. The free end of the latch member 30 has a pair of parallel cross legs, the forwardmost cross leg being referenced 34 and the rearmost cross leg being referenced 36.

The portion of the sidewall 22 which is aligned with the latch member 30 has a pair of projecting pins 38 which are spaced apart from each other by approximately the width of that portion of the latch member 30 between the cross legs 34 and 36. When the lids 12 and 14 are closed the latch member 30 is engaged with the pins 38 by forcing the latch member 30 over the pins such that they project between the cross legs 34 and 36.

The pins 38 each have a slot 40 opening on three sides of the pin. The side of the pins 38 which is furthest away from the latch member 30 is closed and bears against the rear side of the cross leg 34 when the latch 30 is engaged with the pins. Each of the pins 38 has a cutout portion 24 at the outer end of the slot 40, leaving a projecting, L-shaped lug 26. The outer surface of each of the pins 38 is also provided with a recessed channel 41 which is parallel to the slot 40.

Figure 2:
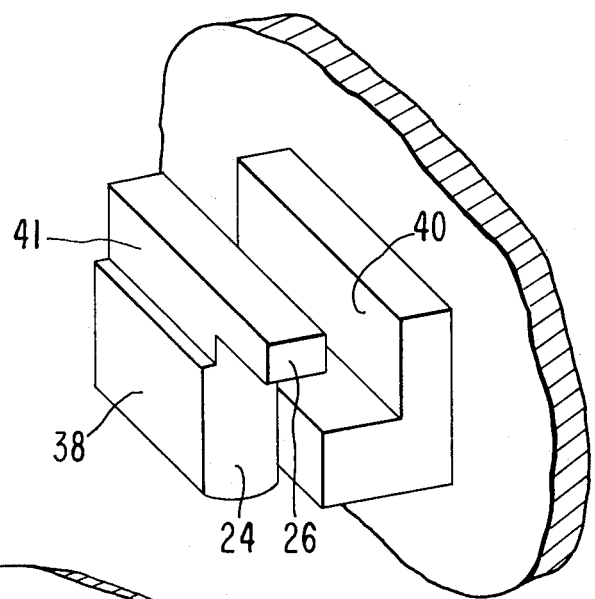
FIG. 2 is an enlarged, perspective view, with portions broken away, of the cassette sidewall and one of the latch pins depicted in FIG. 1.
Figure 3:
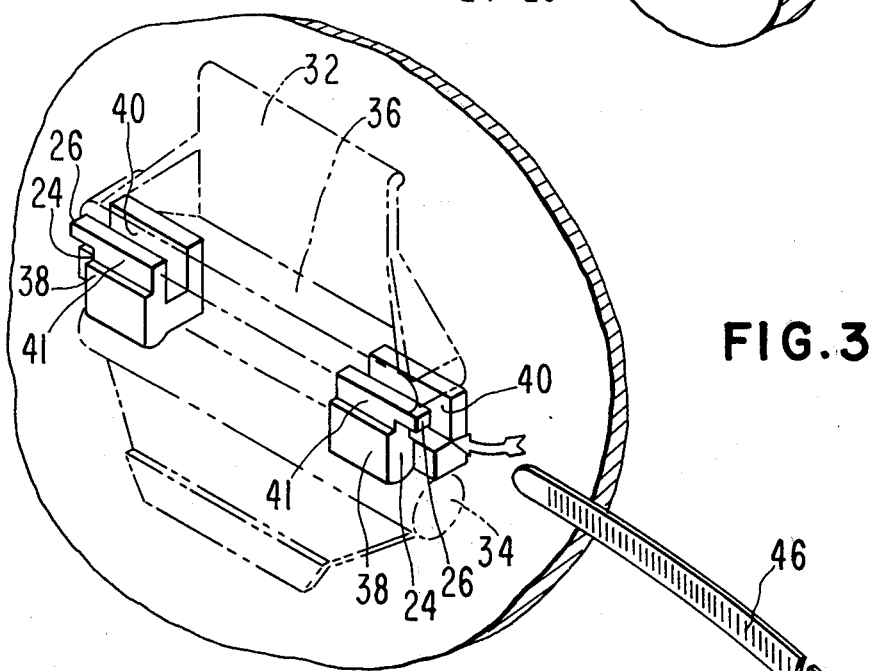
FIG. 3 is an enlarged, perspective view, with portions broken away, of the latch member (in hidden line) when engaged with the latch pins.
Figure 4:
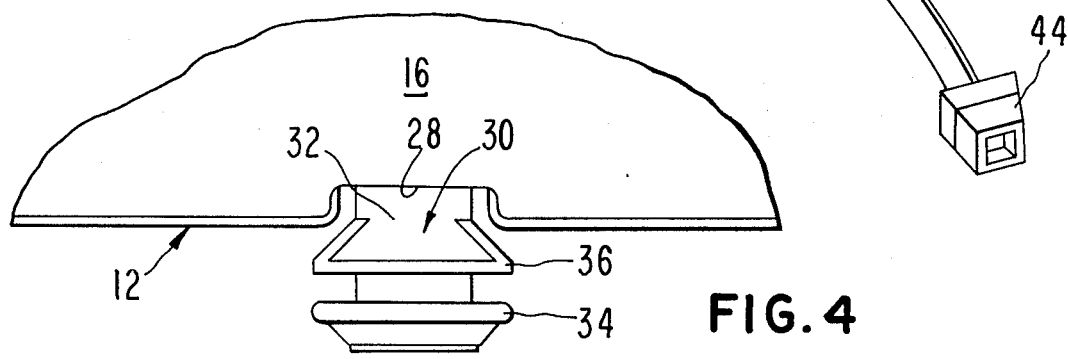
FIG. 4 is a plan view, with portions broken away, of the top lid of the cassette together with the latch member.

As best shown in the enlarged view in FIG. 3, when the latch member 30 is engaged with the pins 38 the rearmost cross leg 36 closes off the rearmost opening of the slot 40. A flexible seal 42 is threaded through the slot 40, underneath the lug 26, as viewed in FIGS. 2 and 3, and over the tops of the pins 38 in the channel 41. The slots 40 in the pins 38 are at a height above the sidewall 22 which is above the top surface of the latch member 30 when the latch member is engaged with the pins 38. Thus the flexible seal 42 passes above the latch member 30 when it is engaged and prevents it from becoming disengaged from the pins 38. The seal 42 also encircles at least a portion of each pin 38 underneath the lug 26 and over the recess 41. The flexible seal 42 may be, for example, a strap of plastic material such as is used for bundling wiring together into a harness and having a shackle 44 at one end through which the other end of the seal must pass. The interior edge 46 of the seal 42 is provided with ridge-like teeth which engage with each other at the shackle 44 to prevent the free end from being withdrawn from the shackle 44. In other embodiments other types of flexible seals may, of course, be utilized.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. In combination with a cassette container of the type having top and bottom lids, a latch for holding the lids closed, the latch comprising a latch member, a flexible hinge integral with the latch member and one of the top and bottom lids, the other of the top and bottom lids having a pair of spaced apart pins, the latch member having a free end which fits between the pins and engages with them to hold the lids closed, the pins having slots therein for receiving a flexible seal.

2. The combination of claim 1 further comprising a continuous, flexible seal which passes through the pin slots and over the engaged latch member, the seal encircling at least a portion of each pin.

3. The combination of claim 1 wherein the free end of the latch member has a pair of parallel cross legs to give the free end an H-shape, the pins projecting between the cross legs when the latch member is engaged with the pins.

4. The combination of claim 3 wherein the pin slots open toward the rearmost cross leg of the free end of the latch member.

5. The combination of claim 4 wherein the slot opening is at least partially closed by the rearmost cross leg of the latch member when the latch member is engaged with the pins.

* * * * *